United States Patent
Mehfuz et al.

(10) Patent No.: US 9,875,761 B1
(45) Date of Patent: Jan. 23, 2018

(54) GRADIENT-INDEX LENS WITH TILTED SIDEWALL

(71) Applicant: Seagate Technology LLC, Cupertino, CA (US)

(72) Inventors: Reyad Mehfuz, Derry (GB); Aidan Dominic Goggin, Donegal (IE); Kelly Elizabeth Hamilton, Derry (GB); John Bernard McGurk, Derry (GB)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/601,041

(22) Filed: May 22, 2017

(51) Int. Cl.
| | | |
|---|---|---|
| G11B 11/00 | (2006.01) |
| G11B 5/48 | (2006.01) |
| G02B 3/00 | (2006.01) |
| G02B 6/32 | (2006.01) |
| G02B 6/42 | (2006.01) |
| G11B 5/00 | (2006.01) |

(52) U.S. Cl.
CPC .......... *G11B 5/4866* (2013.01); *G02B 3/0087* (2013.01); *G02B 6/32* (2013.01); *G02B 6/4212* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,755,650 B2 | 6/2014 | Peng | |
| 2004/0037497 A1 | 2/2004 | Lee | |
| 2005/0007675 A1* | 1/2005 | Matsumoto | G02B 3/0087 359/652 |
| 2009/0185459 A1* | 7/2009 | Matsumoto | G11B 5/4826 369/13.02 |
| 2009/0244778 A1* | 10/2009 | Hasegawa | G11B 5/102 360/234 |
| 2009/0303629 A1* | 12/2009 | Nakano | G11B 5/02 360/31 |
| 2010/0208557 A1* | 8/2010 | Kuiseko | G11B 5/02 369/13.17 |
| 2011/0116170 A1* | 5/2011 | Smith | G02B 3/0087 359/652 |

OTHER PUBLICATIONS

U.S. Appl. No. 15/145,905, filed May 4, 2016, Peng et al.

* cited by examiner

*Primary Examiner* — Peter Vincent Agustin
(74) *Attorney, Agent, or Firm* — Hollingsworth Davis, LLC

(57) ABSTRACT

A gradient-index lens couples light from a laser active region to a waveguide core. The gradient-index lens includes a plurality of bilayers, each of the bilayers having first and second material of respective first and second refractive indices. The bilayers conform to a planar base of the gradient-index lens and further conform to input and output sidewalls of the gradient-index lens. The input sidewall faces the laser active region and the output sidewall faces away from the laser active region. The input and output sidewalls are tilted at respective acute angles relative to the planar base.

20 Claims, 10 Drawing Sheets

GRADIENT-INDEX LENS WITH TILTED SIDEWALL

SUMMARY

The present disclosure is directed to a gradient-index lens with a tilted sidewall. In one embodiment, a gradient-index lens couples light from a laser active region to a waveguide core. The gradient-index lens includes a plurality of bilayers, each of the bilayers having first and second material of respective first and second refractive indices. The bilayers conform to a planar base of the gradient-index lens and further conform to input and output sidewalls of the gradient-index lens. The input sidewall faces the laser active region and the output sidewall faces away from the laser active region. The input and output sidewalls are tilted at respective acute angles relative to the planar base.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
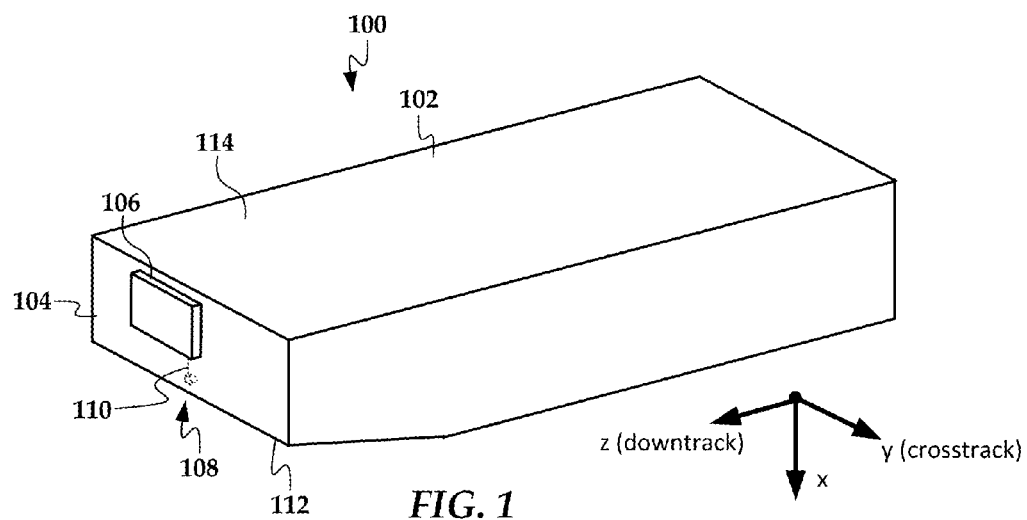
FIG. 1 is a perspective view of a slider assembly according to an example embodiment.

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

In many implementations, the read/write head and laser diode are formed using separate processes, aligned using a surface-mount placement process (e.g., pick and place), and bonded together (e.g., using solder). While this type of assembly process is well-established for assembly of electronic components, there are challenges in mass-assembly of HAMR read/write heads using these processes. For example, it can be challenging to precisely align a HAMR laser package to the head using pick-and-place techniques that are used for electrical components.

In the present disclosure, hard drive recording heads are proposed onto which at least part of a semiconductor laser (e.g., crystalline, epitaxial layer) is not self-supporting (e.g., not a separately packaged device) but is physically carried by same substrate that carries the other components of the read/write head (e.g., write coil and poles, reader stack) without the use of a separate or intermediate support during attachment. Carrying the semiconductor laser with the read/write head substrate, without a separate or intermediate support substrate, can help to reduce the size and weight of the head, and it can also allow for the use of laser geometries and designs that are very different from simple edge-emitting cleaved facet lasers.

In at least some cases, parts of the laser (e.g., GaAs active region) are incompatible with epitaxial growth on the substrate. As such, the laser cannot be formed using the same layer deposition processes used to form the magnetic and optical components that are integrated into the head. In embodiments described below, the laser may instead be formed on the substrate by transfer printing a thin, non-self-supporting crystalline layer (epitaxial layer), or a stack of such layers, from a growth substrate on which they were formed to a target substrate. Thereafter, the epitaxial layer and substrate are further processed (e.g., masked, etched, additional layers added) to form the slider-integral laser. This process of transferring non-self-supporting layers of epitaxial-growth-incompatible layers is referred to herein as On-Wafer Laser (OWL) process integration. This process may also be referred to as transfer printing, dry transfer printing, nanoprinting, wafer-bonding, etc.

One challenge in assembling laser diodes in a nanophotonic platform is the precise alignment needed. While electrical components can operate if misaligned so long as the conductive paths are sufficiently established, misalignment between a laser and read/write head can result in a loss of optical efficiency that can render the head unusable. Coupling light from an external laser source to the waveguide comes with a new set of challenge when a wafer-bond laser is used as the source. The complications arise from additional design requirements, which are needed to be considered in the input coupler which assists in coupling light from the laser to the waveguide core. The present disclosure relates to a robust gradient-index lens coupler that addresses this challenge.

In reference now to FIG. 1, a perspective view shows a read/write head 100 according to an example embodiment. The read/write head 100 may be used in a magnetic data storage device, e.g., HAMR hard disk drive. The read/write head 102 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk. The read transducers may include one or more magnetoresistive stacks that induce a change in a bias current in response to a changing magnetic field. The write transducers may include one or more magnetic coils that cause a magnetic pole to apply a magnetic field to the recording medium in response to an applied current.

The illustrated read/write head 100 is configured as a HAMR device, and so includes additional components that form a hot spot on the recording medium near the read/write transducer 108. These components include an energy source 106 (e.g., laser diode 106) and a light coupling path 110. The light coupling path 110 includes optical components such as a waveguide that delivers electromagnetic energy from the energy source 106 to a near-field transducer that is part of the read/write transducers 108. The near-field transducer achieves surface plasmon resonance in response and directs the energy out of a media-facing surface 112 to create a small hot spot on the recording medium.

The laser diode 106 is wafer bonded (or similarly attached) to the trailing edge 104 of the slider body 102 in this embodiment. In other embodiments, the laser diode 106 may be located elsewhere, such as top surface 114. Generally, the laser diode 106 is formed by bonding epitaxial layers to a layer of the substrate that forms the slider body. Then the epitaxial layers may be further processed (e.g., trimmed to final shape/alignment, have leads attached, coated with additional layers) to form the final laser diode 106 that is integral with the slider body 102. The light coupling path 110 includes a gradient-index lens as shown below that facilitates coupling the laser diode 106 to the waveguide.

Figure 2:
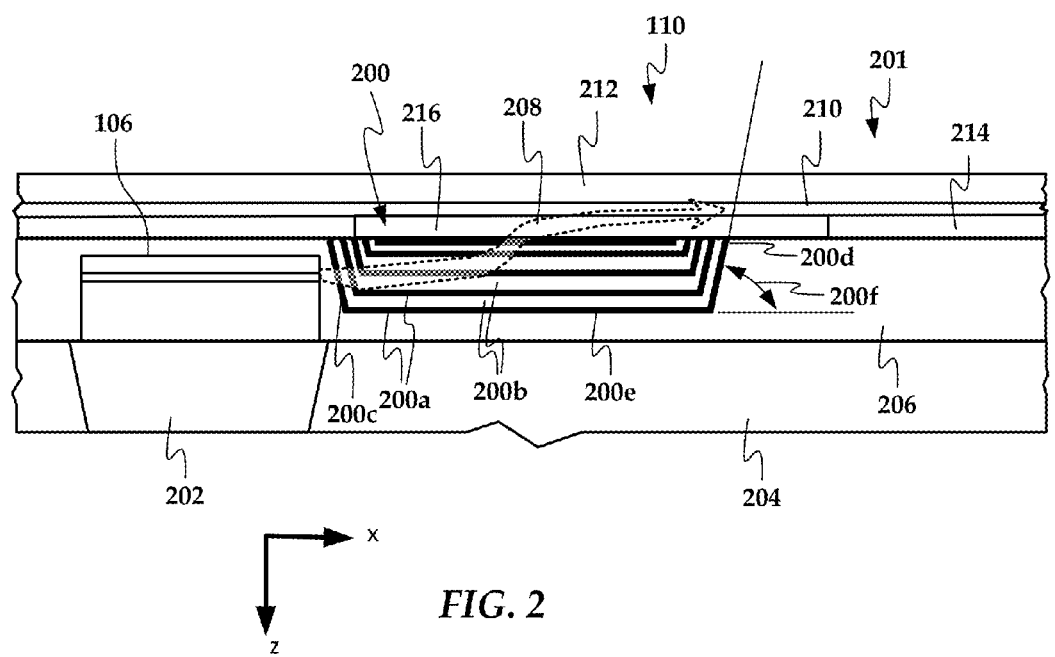
FIG. 2 is cross-sectional view of a light-coupling path according to an example embodiment.

In FIG. 2, a cross-sectional view of light-coupling path 110 shows a gradient-index lens 200 used to couple the laser diode 106 to waveguide 201. Generally, the laser diode 106 is thermally coupled to a heat sink 202 that is formed in a substrate layer 204 of a structural dielectric (e.g., AlOx). An optical dielectric layer 206 (e.g., optical quality AlOx) is formed on the substrate layer 204 and surrounds the laser diode 106. The gradient-index lens 200 is also located in the optical dielectric layer 206.

The gradient-index lens 200 is formed of alternating layers 200a-b of different index materials. By setting each layer 200a-b at a specified thickness, the effective refractive index of the lens 200 can be configured to change in a particular way at different locations through the lens 200. The lens 200 includes tilted sidewalls 200c-d, and the layers 200a-b conform to both the tilted input and output sidewalls 200c-d and a substrate-parallel base 200e of the lens 200. The sidewalls 200c-d are at an acute (more than zero but less than 90 degrees) angle 200f relative to the planar base 200e.

Light 208 exiting the laser 106 enters through input sidewall 200c and is directed towards a waveguide core 210 that is surrounded by top and bottom cladding layers 212, 214. A coupling layer 216 is located between the top of the lens 200 and the waveguide core 210. Generally, the coupling layer 216 has a refractive index between that of the core 210 and cladding layers 212, 214. The tilted sidewalls 200c-d enable the lens to achieve high coupling efficiency (e.g., nearly 80%) and have a high amount of tolerance to misalignment between the laser 106 and the waveguide core 210.

Figure 3:
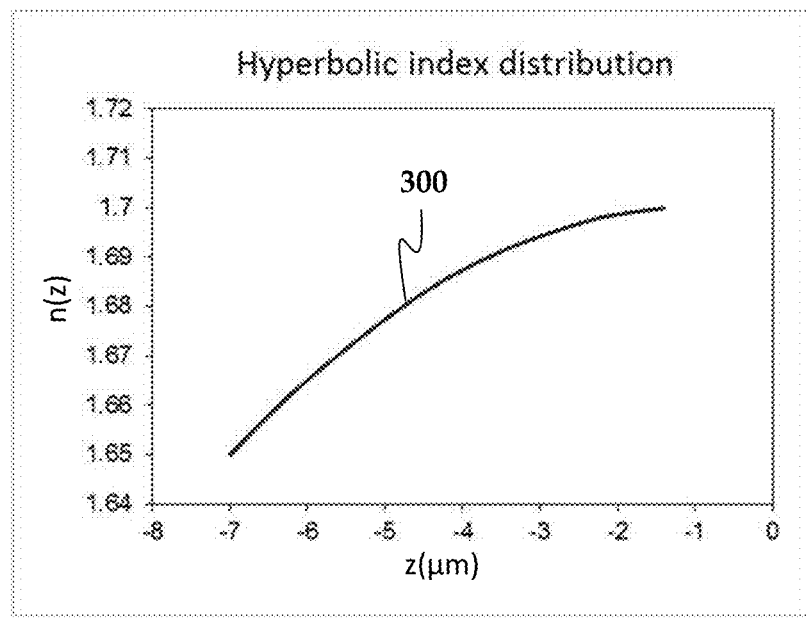
FIGS. 3 and 4 are graphs showing effective and actual index distributions for a gradient-index lens according to an example embodiment.

In FIG. 3, a graph shows an index distribution for a gradient-index lens according to an example embodiment. Thicknesses of the lens layer may vary according to a desired distribution, which results in an effective distribution as shown in FIG. 3. Different variable-index distributions may be used, such as a parabolic index distribution and hyperbolic secant index distribution. The curve 300 in FIG. 3 represents a hyperbolic secant index distribution, where the effective index n(z) is expressed as $n(z)=n_{hi}*\text{sech}(\alpha z)$, where $n_{hi}$ is the refractive index of the higher-index layer of the bilayer, z is distance from the core, and $\alpha$ is the gradient parameter. In this example, the lens thickness is 4 µm.

To set the layer thicknesses to conform to this distribution, a number of bilayers is selected (the example in FIG. 3 uses 14 bilayers). Equation (1) below shows how layer thicknesses are found at each z-location, where $n_{hi}$ and $n_{low}$ are the indices of the high- and low-index layers, and $d_{hi}$ and $d_{low}$ are the thicknesses of the high- and low-index layers.

$$n^2(z) = \frac{n_{hi}^2 d_{hi} + n_{low}^2 d_{low}}{d_{hi} + d_{low}} \tag{1}$$

The thicknesses of the lens sidewall may be the same as $d_{hi}$ and $d_{low}$ in some embodiments, although will vary in a direction perpendicular to the sidewall angle and not the z-direction. This perpendicular direction of the sidewall is more closely aligned to the x-axis than to the z-axis, particularly for sidewall angles close to 90 degrees as defined by sidewall angle 200f in FIG. 2 (or for sidewall angles close to zero as defined in FIG. 6). As described below, in some embodiments the sidewall layer thicknesses may be proportional to but not equal to that of the base layers.

Figure 4:
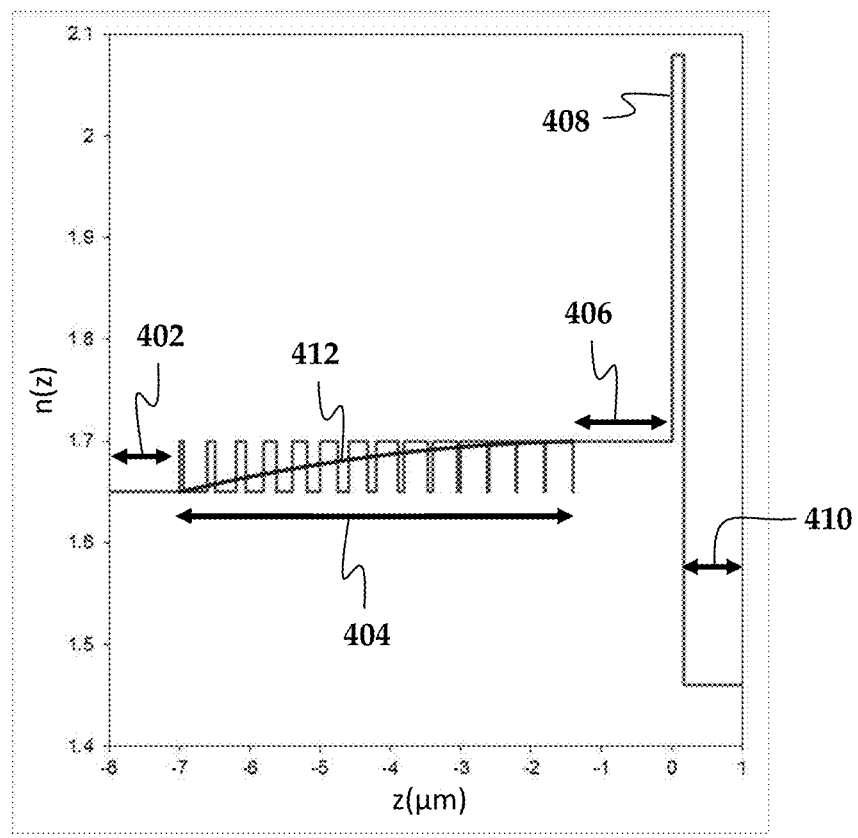

In FIG. 4, a graph shows the indices of the layers shown in FIG. 2 according to an example embodiment. Region 402 represents the index of optical dielectric layer 206. Region 404 represents the index of layers 200a-b of the gradient-index lens 200. Curve 412 represents the effective index of the lens 200, e.g., as shown in FIG. 3. Region 406 represents the index of coupling layer 216. Region 408 represents the index of the core 210. Region 410 represents index of the top cladding layer 212. As seen in the graph, the higher index of layers 200a-b in region 404 of this example is the same as the index 406 of coupling layer 216. Similarly, the lower index of layers 200a-b in region 404 of this example is the same as the index 406 of optical dielectric material layer 206, which is itself greater than the index of the cladding, e.g., shown in region 410 of the graph.

Figure 5:
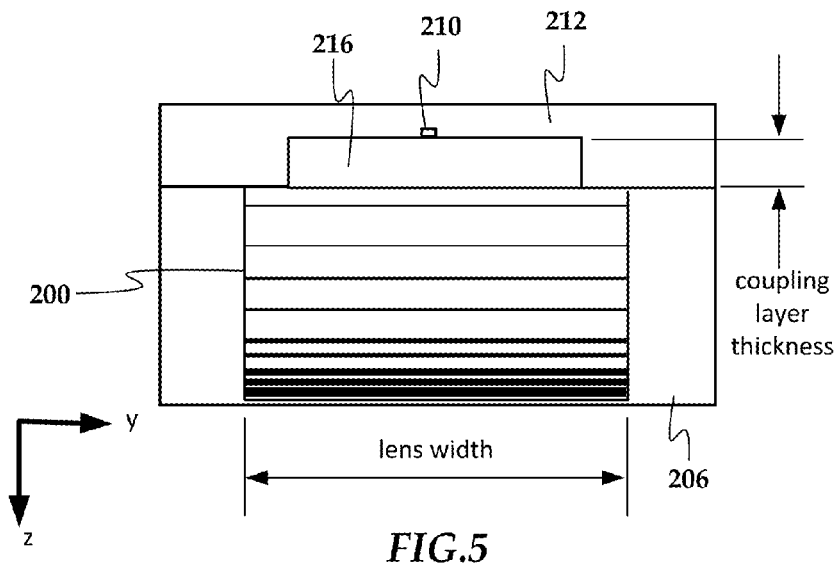
FIGS. 5 and 6 are side views show geometric parameters of a gradient-index lens according to an example embodiment.
Figure 6:
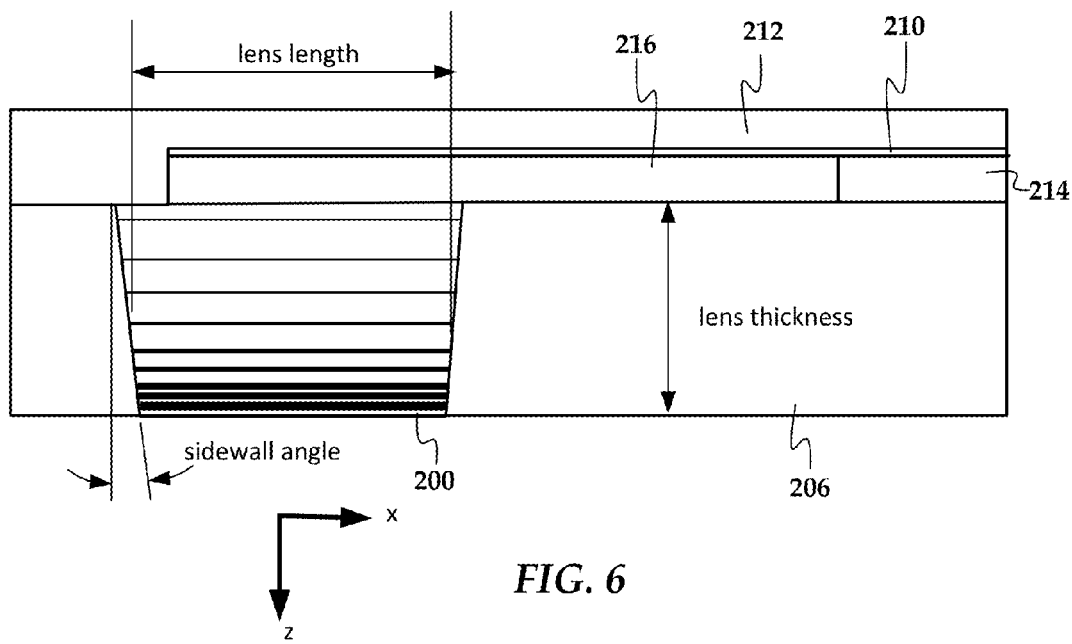
Figure 7:
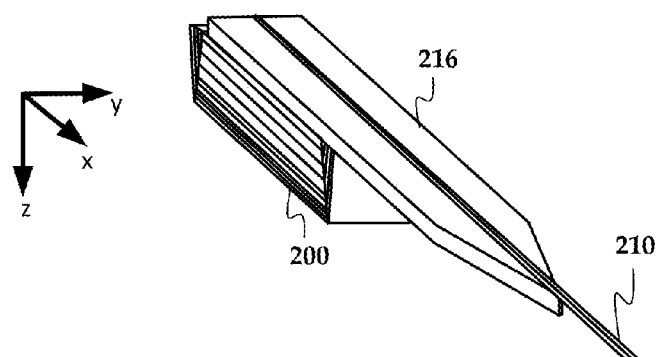
FIG. 7 is a perspective view of a light delivery path according to an example embodiment.

A performance model of the light delivery system shown in FIGS. 1 and 2 was analyzed to determine coupling efficiency (CE) of the lens 200. In FIGS. 5 and 6, side views show geometric parameters that were varied in the model to determine optimum performance of the lens 200 and other components in the coupling path. Note that the sidewall angle shown in FIG. 6 is 90 degrees minus the angle 200f shown in FIG. 2. In FIG. 7, a perspective view shows the lens 200, core 210, and coupling layer 216. Note that the coupling layer 216 has a crosstrack width about the same as that as the lens 200, and that the coupling layer tapers at a location away from the lens 200 in the light propagation direction (x-direction in this view). The lens 200 was modeled with 14 bilayers, each bilayer having two SiON layers with different indices: n1=1.7 and n2=1.65.

Figure 8:
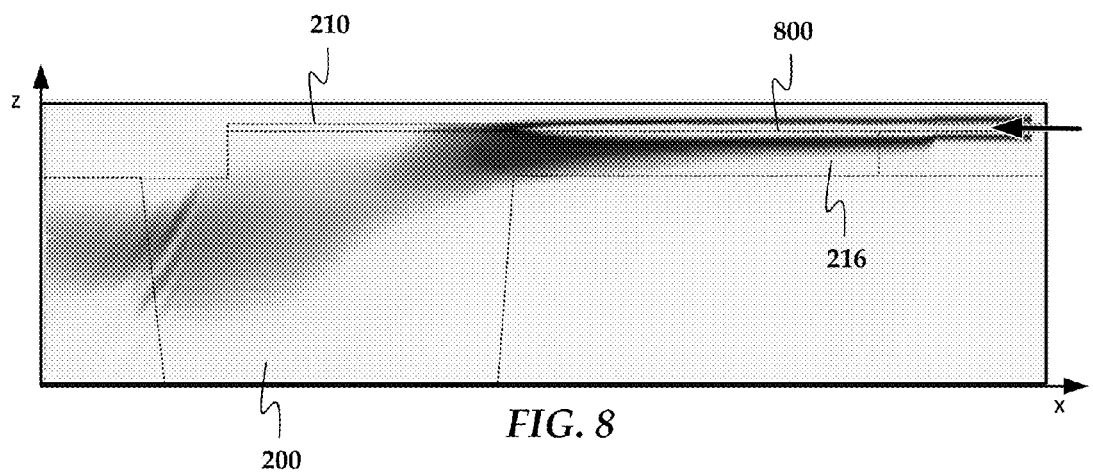
FIGS. 8 and 9 are contour plots shown reverse-modelling field strength according to an example embodiment.
Figure 9:
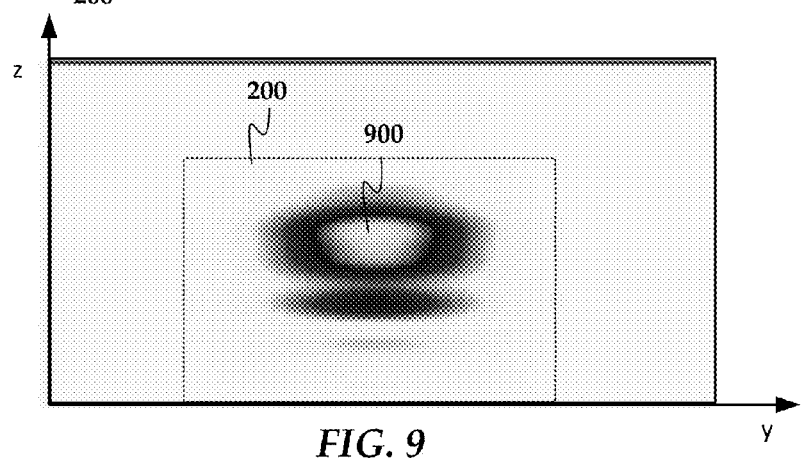

In FIGS. 8 and 9, contour plots show field strength for a reverse model of a light coupling arrangement according to an example embodiment. In the reverse model, the light is injected into the core (as indicated by the arrow on the right hand side of the plot in FIG. 8) and exits the lens 200 on the left. This enables determining an ideal spot size and injection point into the lens 200. Note that the lighter regions 800 and 900 are regions of maximum field value for these plots.

Figure 10:
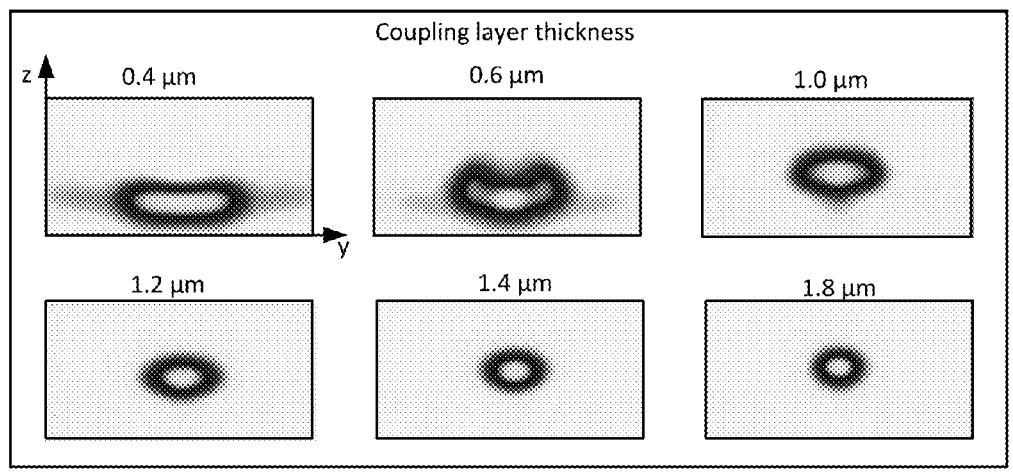
FIG. 10 is a series of field plots showing spot size and location on a lens for various thickness of a coupling layer according to an example embodiment.

In FIG. 10, a series of field plots show spot size and location at the lens 200 for various thicknesses of the coupling layer 216 as shown in FIG. 5. The coordinate system and scale are the same for all of the plots. As with the plot in FIG. 9, the lighter shaded regions in the center of the spots are regions of maximum field value. Note that the location of the spot moves higher up (higher z-value) with increasing coupling layer thickness. As result, optimum injection location is dependent on the coupling layer thickness. Mode matching the field profiles for 0.4 and 0.6 μm thicknesses could be difficult. As a result, the profiles for the 1.2 um and 1.4 um thick coupling layers are good candidates for this configuration, being relatively easy to access and mode-match.

Figure 11:
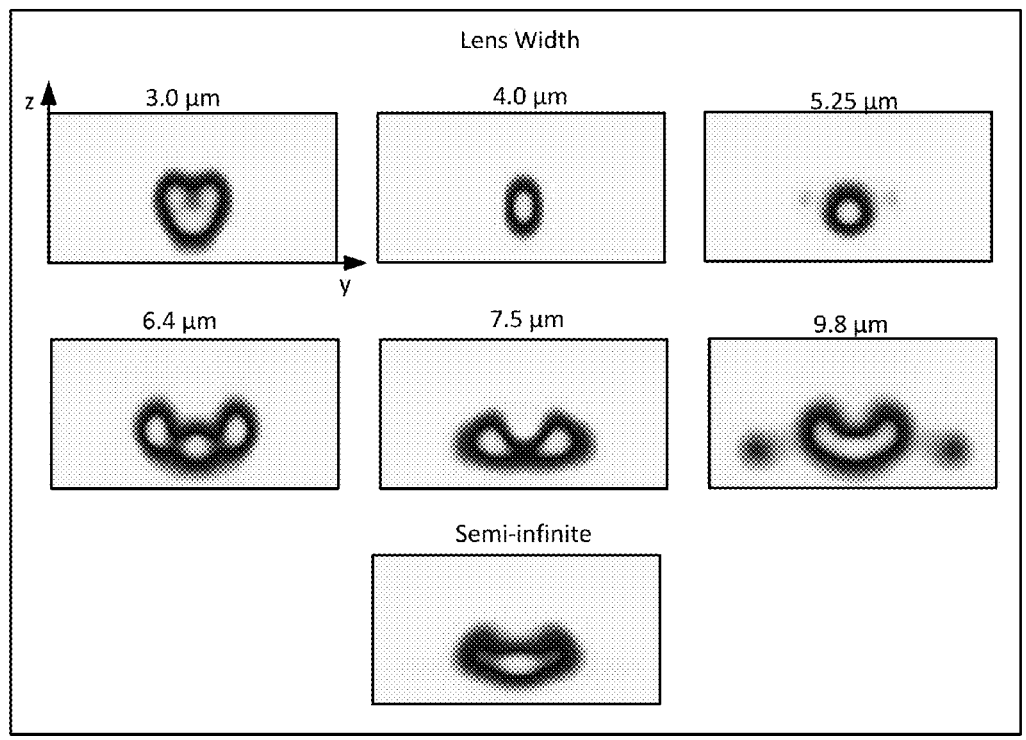
FIG. 11 is a series of field plots showing spot size and location on a lens for various lens widths according to an example embodiment.

In FIG. 11, a series of field plots show spot size and location at the lens 200 for various widths of the lens 200 as shown in FIG. 5. The coordinate system and scale are the same for all of the plots. As with the plot in FIG. 9, the lighter shaded regions in the center of the spots are regions of maximum field value. Mode matching the field profiles for 6.4 μm and higher widths could be difficult. Preferred lens width lies between 3 μm to 5.5 μm. The lens width does not have as much effect on optimal injection position as the coupling layer thickness.

Figure 12:
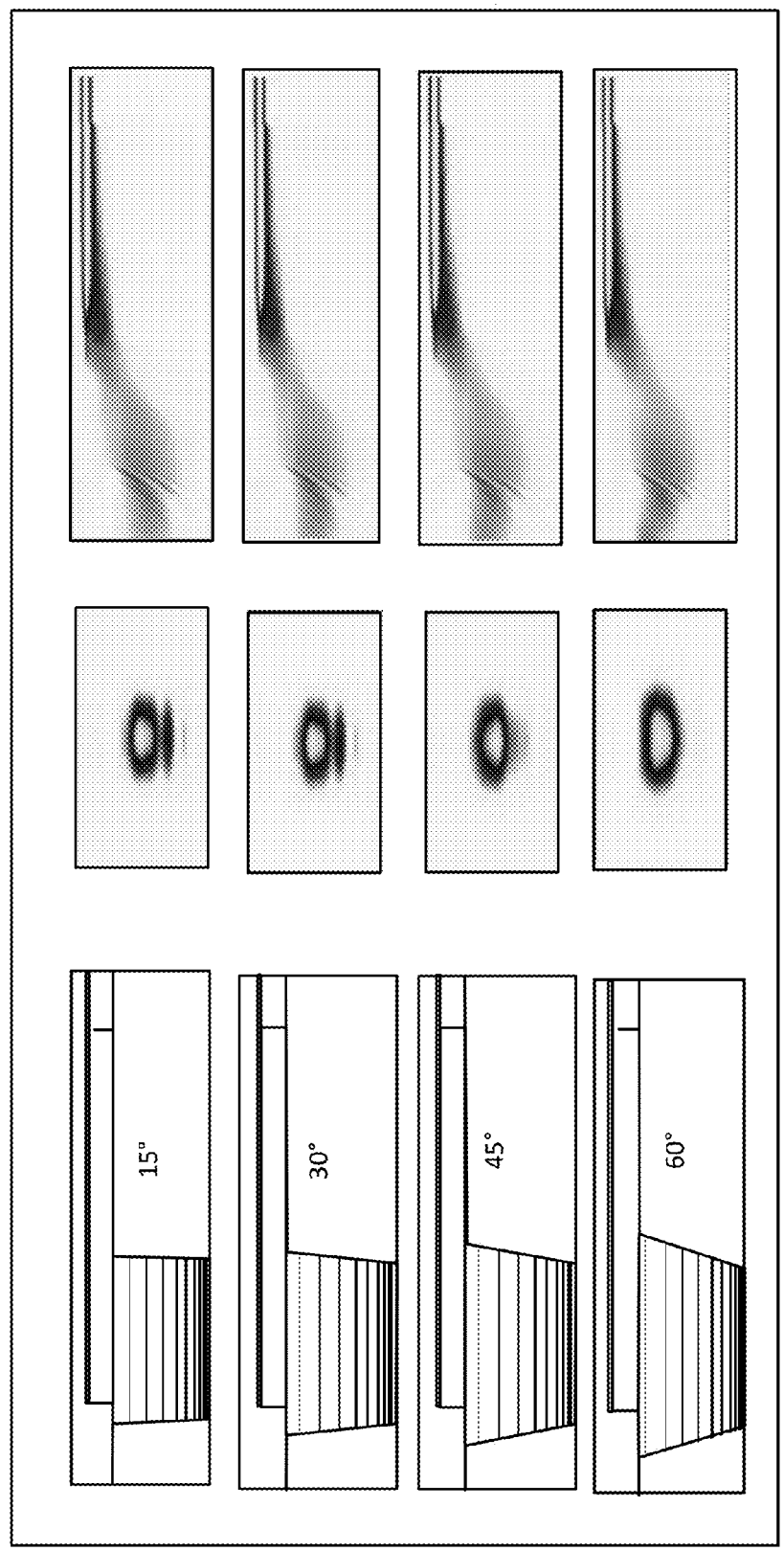
FIG. 12 is a series of field plots showing spot size and location on a lens for various sidewall angles according to an example embodiment.

In FIG. 12, a series of field plots show spot size and location at the lens 200 for various lens sidewall angles as shown in FIG. 6. Based on these results, a wall angle of about 20 degrees appears optimal for this configuration. Note that a 20 degree wall angle as shown in FIG. 12 corresponds to a 70 degree wall angle 200f as defined in FIG. 2. In one embodiment, the wall angle 200f may be 65 to 75 degrees, which corresponds a range of 15 to 25 degrees using the convention shown in FIG. 12.

Figure 13:
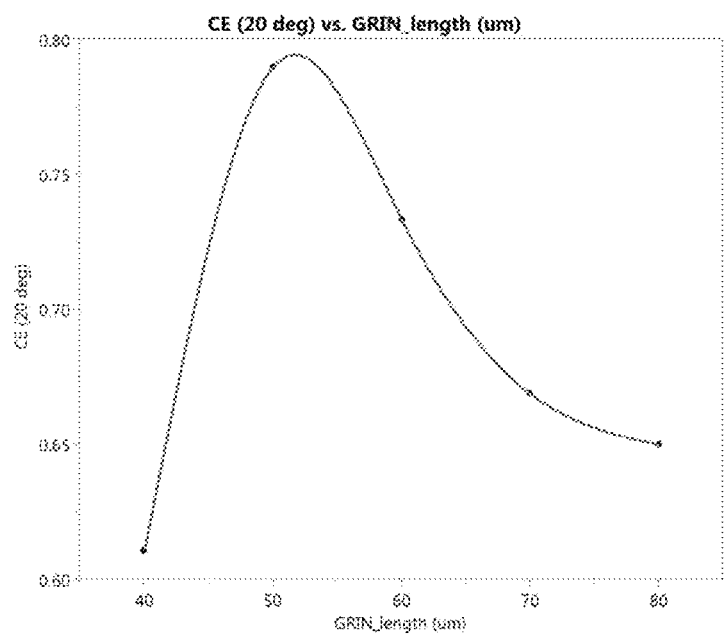
FIG. 13 is a graph showing coupling efficiency as a function of lens length according to an example embodiment.

Using the parameters obtained from the reverse modeling described above, a forward modeling analysis was performed using a wall angle of 20°, coupling layer and lens width of 5 μm, lens thickness 6 μm, and coupling layer thickness of 1.4 μm. In FIG. 13, a graph shows coupling efficiency for this configuration as a function of lens length (see FIG. 6). A 50 μm length shows the highest coupling efficiency in this configuration.

Figure 14:
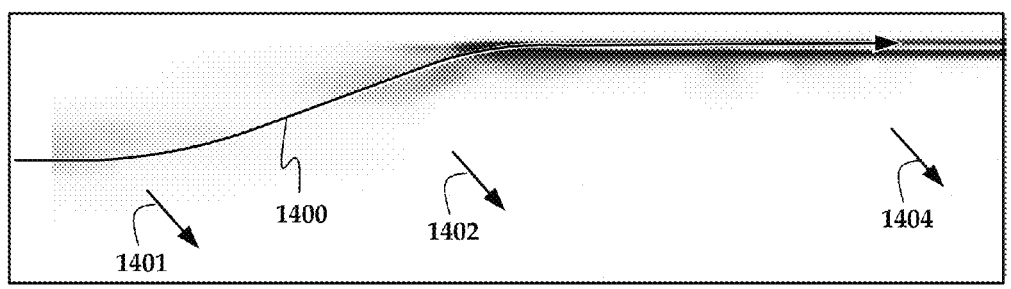
FIG. 14 is a contour plot showing forward-modelling field strength for a gradient-index lens according to an example embodiment.

In FIG. 14, a field plot shows the results of the forward modeling analysis for the 50 μm long lens. Arrow 1400 represents the light path through the lens, coupling layer, and core. Arrows 1401, 1402, and 1404 represent where light is scattered from the lens sidewall and coupling layer interfaces, respectively.

Figure 15:
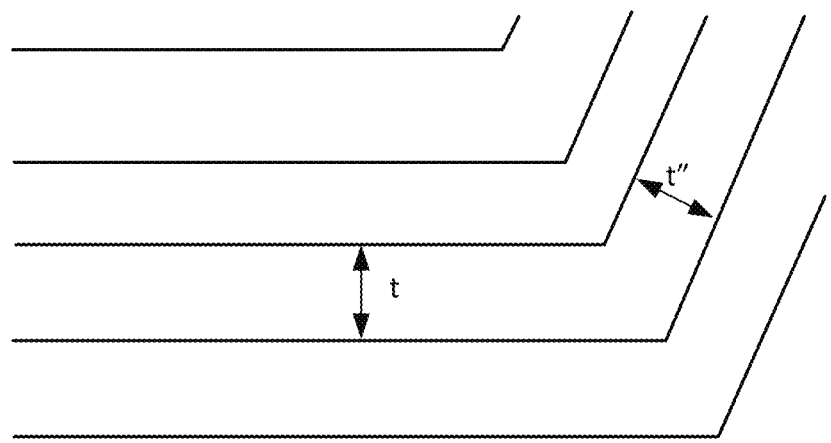
FIG. 15 is a diagrams showing a relation between sidewall thickness and thickness of the planar base of a gradient-index lens according to an example embodiment.
Figure 16:
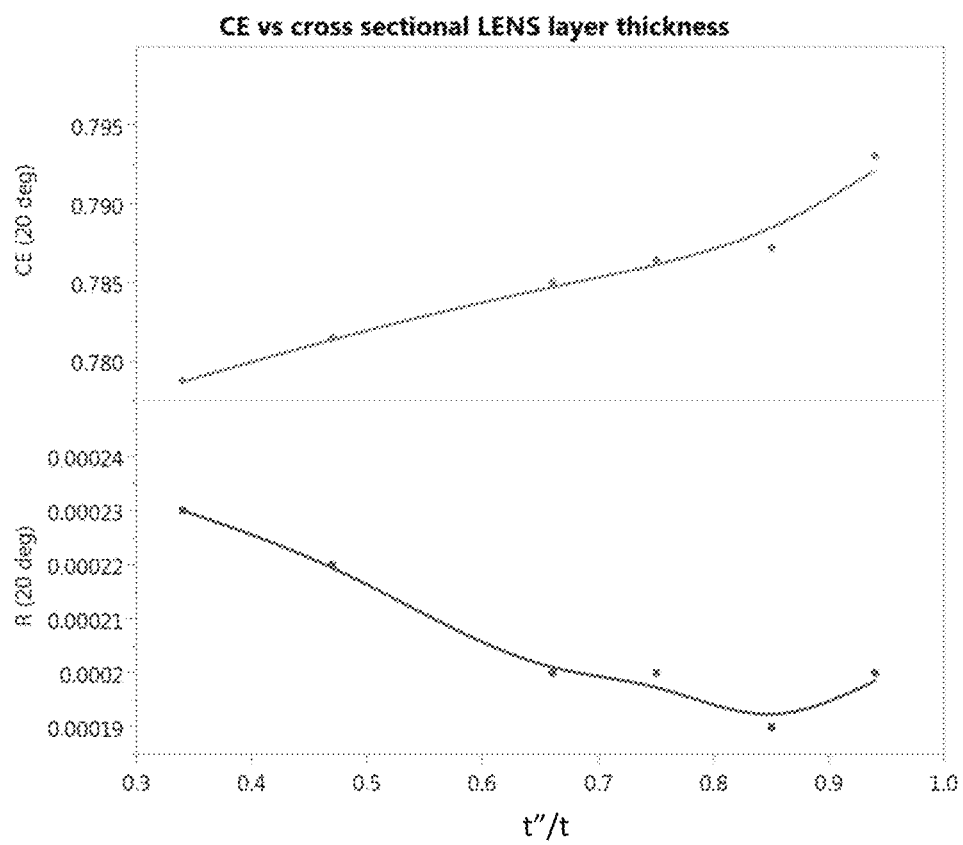
FIG. 16 is a graph showing how different values of sidewall thickness affect coupling efficiency and reflected light.

In order to reduce losses at the sidewall, additional analyses were performed with different sidewall coverages. In FIG. 15, a diagram shows the relation between sidewall thickness t" and thickness t of the planar base of the gradient-index lens. The thickness t" may be the same on both input and output sidewalls, or a different thickness may be used for the output sidewall. Similarly, the output sidewall could be different than the input sidewall, as output sidewall may not have as significant effect on performance as the input sidewall In FIG. 16, a graph shows how different values of t" affect coupling efficiency and reflected light. For this analysis, sidewall angle is 20 degrees and lens length is 50 Generally, a value of t"/t of around 0.8 provides good coupling efficiency and minimizes scattering. Reflected light is small and not significantly affected by the value of t".

Figure 17:
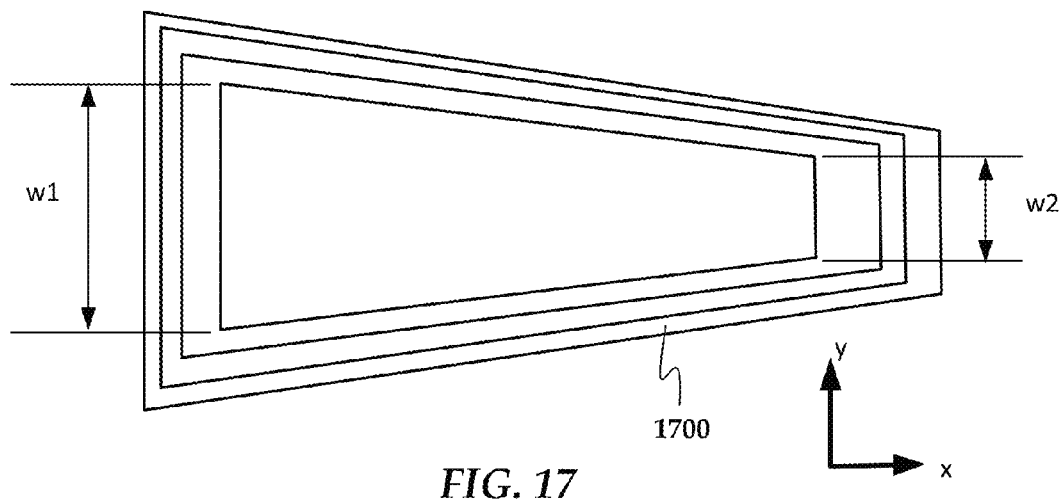
FIG. 17 is a diagram showing a tapered gradient-index lens according to an example embodiment.
Figure 18:
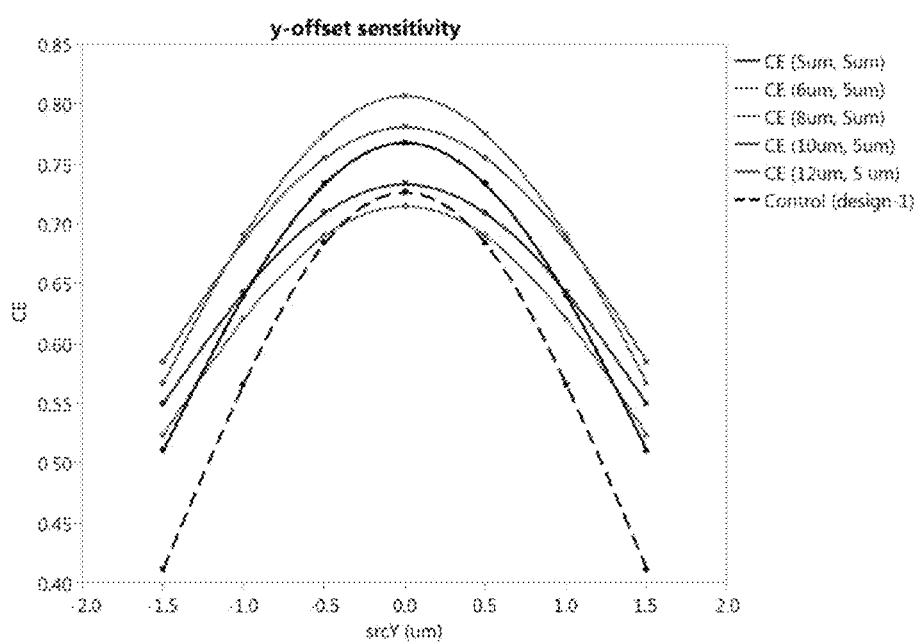
FIG. 18 is a graph showing the effects of different taper angles on coupling efficiency of a lens according to an example embodiment.

In FIG. 17, a block diagram shows a tapered gradient-index lens 1700 according to an example embodiment. The lens 1700 tapers from a larger crosstrack width w1 at the input end to a smaller crosstrack width w2 near the output end. In FIG. 18, a graph shows the effects of different taper angles on coupling efficiency. These results are also summarized in Table 1 below.

TABLE 1

| w1 (um) | Max CE | CE drop @ +/−1.5 um |
|---|---|---|
| 5 | 76.8 | 26% |
| 6 | 80% | 24% |
| 8 | 78% | 19% |
| 10 | 73% | 18.3% |
| 12 | 71% | 19% |

Figure 19:
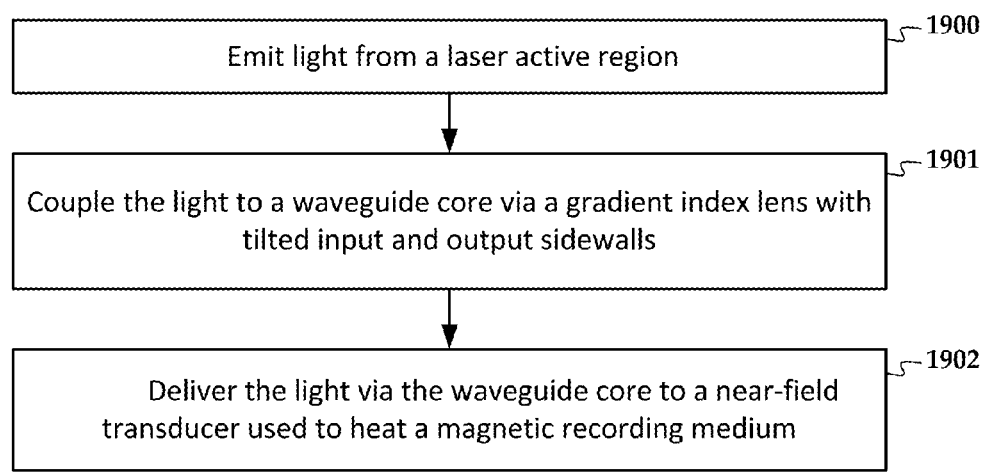
FIG. 19 is a flowchart of a method according to an example embodiment.

In FIG. 19, a flowchart illustrates a method according to an example embodiment. The method involves emitting 1900 light from a laser active region, e.g., one which is formed on a non-self-supporting structure and bonded to a substrate of a recording head. The light is coupled 1901 to a waveguide core via a gradient-index lens. The gradient-index lens includes a plurality of bilayers, each of the bilayers having first and second material of respective first and second refractive indices. The bilayers conform to a planar base of the gradient-index lens and further conform to a tilted input and output sidewalls of the gradient-index lens. The input sidewall faces the laser active region and the output sidewall faces away from the laser active region. The tilted input and output sidewalls are tilted at respective acute angles relative to the planar base. The light is delivered 1902 via the waveguide core to a near-field transducer. The near-field transducer used to heat a magnetic recording medium.

In summary, a gradient-index lens input coupler is described that integrates with an on-wafer laser. Nearly 80% of emitted laser light can be coupled through the lens coupler. Greater sidewall coverage improves coupling efficiency. A truncated lens helps spot matching, which boosts coupling efficiency. Lens tapering improves misalignment tolerance.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head, comprising:
a laser active region formed on a non-self-supporting structure and bonded to a substrate of the recording head;
a waveguide core that delivers light to a near-field transducer; and
a gradient-index lens coupling the light from the laser active region to the waveguide core, the gradient-index lens comprising a plurality of bilayers, each of the bilayers comprising first and second material of respective first and second refractive indices, wherein the bilayers conform to a planar base of the gradient-index lens and further conform to input and output sidewalls of the gradient-index lens, the input sidewall facing the laser active region and the output sidewall facing away from the laser active region, the input and output sidewalls tilted at respective acute angles relative to the planar base.

2. The recording head of claim 1, further comprising:
a coupling layer between the gradient-index lens and the waveguide core;
a top cladding layer deposited over a side of the waveguide core layer facing away from the gradient-index lens, the coupling layer having third index of refraction between that of the core and the top cladding layer.

3. The recording head of claim 2, wherein the third refractive index is the same as a higher one of the first and second refractive indices of the gradient-index lens.

4. The recording head of claim 3, further comprising a dielectric layer surrounding the laser and the gradient-index lens, the dielectric layer having a fourth refractive index that is the same as a lower one of the first and second refractive indices of the gradient-index lens, the fourth refractive index being higher than that of the top cladding layer.

5. The recording head of claim 1, wherein first thicknesses of the bilayers on at least the input sidewall are less than second thicknesses of the bilayers on the planar base of the gradient-index lens.

6. The recording head of claim 1, wherein the gradient-index lens tapers from a larger crosstrack width at the input sidewall to a smaller crosstrack width near the output sidewall.

7. The recording head of claim 1, wherein the acute angles are between 60 and 95 degrees.

8. The recording head of claim 1, wherein first and second thicknesses of the first and second materials of the bilayer change according to a variable distribution.

9. The recording head of claim 8, wherein the variable distribution comprises a parabolic distribution.

10. The recording head of claim 8, wherein the variable distribution comprises a hyperbolic secant distribution.

11. A method comprising:
emitting light from a laser active region formed on a non-self-supporting structure and bonded to a substrate of a recording head;
coupling the light to a waveguide core via a gradient-index lens, the gradient-index lens comprising a plurality of bilayers, each of the bilayers comprising first and second material of respective first and second refractive indices, wherein the bilayers conform to a planar base of the gradient-index lens and further conform to a tilted input and output sidewalls of the gradient-index lens, the input sidewall facing the laser active region and the output sidewall facing away from the laser active region, the input and output sidewalls tilted at respective acute angles relative to the planar base; and
delivering the light via the waveguide core to a near-field transducer of the recording head, the near-field transducer heating a magnetic recording medium in response thereto.

12. The method of claim 11, wherein coupling the light to the waveguide core comprises coupling the light from the gradient-index lens to a coupling layer between the gradient-index lens and the waveguide core.

13. The method of claim 11, wherein the gradient-index lens tapers from a larger crosstrack width at the input sidewall to a smaller crosstrack width near the output sidewall.

14. The method of claim 11, further comprising applying a magnetic field to the recording medium via a write transducer of the recording head during the heating.

15. A recording head, comprising:
a laser located on a substrate of the recording head;
a waveguide core that delivers light to a near-field transducer;
a gradient-index lens coupling the light from the laser to the waveguide core, the gradient-index lens comprising a plurality of bilayers, each of the bilayers comprising first and second material of respective first and second refractive indices, wherein the bilayers conform to a planar base of the gradient-index lens and further conform to a tilted input and output sidewalls of the gradient-index lens, the tilted input sidewall facing the laser and the output sidewall facing away from the laser, the tilted input and output sidewalls tilted at respective acute angles relative to the planar base;
a coupling layer between the gradient-index lens and the waveguide core; and
a top cladding layer deposited over a side of the waveguide core layer facing away from the gradient-index lens, the coupling layer having third index of refraction between that of the core and the top cladding layer.

16. The recording head of claim 15, wherein the laser comprises a non-self-supporting active region that is bonded to the substrate.

17. The recording head of claim 15, wherein first thicknesses of the bilayers on at least the input sidewall are less than second thicknesses of the bilayers on the planar base of the gradient-index lens.

18. The recording head of claim 15, wherein the gradient-index lens tapers from a larger crosstrack width at the input sidewall to a smaller crosstrack width near the output sidewall.

19. The recording head of claim 15, wherein the acute angles are between 60 and 85 degrees.

20. The recording head of claim 15, wherein first and second thicknesses of the first and second materials of the bilayer change according to one of a parabolic and hyperbolic secant distribution.

* * * * *